June 29, 1954  E. A. PATTON  2,682,083
METHOD OF MAKING MOLDED PANELS
Filed Nov. 5, 1952   5 Sheets-Sheet 1

Inventor:
Edward A. Patton
By Bair, Freeman and Molinare
Attorneys

June 29, 1954     E. A. PATTON     2,682,083
METHOD OF MAKING MOLDED PANELS
Filed Nov. 5, 1952     5 Sheets-Sheet 2

Inventor:
Edward A. Patton
By Bair, Freeman and Molinare
Attorneys

Inventor:
Edward A. Patton

Patented June 29, 1954

2,682,083

UNITED STATES PATENT OFFICE 2,682,083

METHOD OF MAKING MOLDED PANELS

Edward A. Patton, Clinton, Iowa, assignor to Curtis Companies Incorporated, Clinton, Iowa, a corporation of Iowa Application November 5, 1952, Serial No. 318,929

3 Claims. (Cl. 18—55)

This invention relates to a method of making cellulose panels by compression molding of granulated wood or the like.

Reference is made to the copending applications of myself, Merle W. Baker, Forrest F. Beil and Charles F. Curtis, II, Serial No. 28,158 (filed May 20, 1948, now forfeited) of which this application is a continuation-in-part; Serial No. 59,902 (filed November 13, 1948); Serial No. 59,903 (filed November 13, 1948, now U. S. Patent 2,583,249); and Serial No. 224,804 (filed May 5, 1951); and entitled, respectively, "Board of Compressed Cellulose Material and Method for Manufacturing the Same"; "Pan Filling Machine"; "Apparatus for Manufacturing Boards of Compressed Cellulose Material and the Like"; and "Method of Making a Cellulose Board." These applications show apparatus and methods for manufacturing a compressed cellulose board characterized by high strength, freedom from warping and many other desirable characteristics by compression molding of a mixture of granulated wood and a small amount of resinous binder in relatively shallow generally flat pan or tray-like molds. More particularly, the applications disclose the molding of a mixture of granulated wood with a resinous binder that may contain as little as 4% resin and is characterized by a moisture content of at least 5%. The resinous binder is preferably, but not necessarily, thermosetting and is characterized by a capacity for flowing under the temperature and pressure conditions maintained during the pressing operation for an appreciable period of time before the resin is set or cured or otherwise brought into the condition in which the binder is present in the finished board. In the molding operation, the temperature of the molding mixture is raised. Thereafter a pressure of at least 150 lbs, but less than 500 lbs. per square inch is maintained, at least initially. Further, the exact pressure employed is correlated with the moisture content of the pressed mixture as disclosed in detail hereinbelow. The temperature is maintained for a sufficient time to cure or set the resin or otherwise bring the resin into the condition characteristic of the finished board. Further, the margins of the layer of mixed resin and wood being pressed are compressed to from 40% to 60% of the thickness of the remaining portions of the compressed layer. Finally, the pressure is released slowly (within a time of several seconds or minutes), rather than all at once. The compressed edges may then be trimmed off to leave a panel or board of uniform thickness.

The significance of the above disclosed steps is explained as follows:

Since the margins of the layer being pressed are compressed very much more than the remaining portions of the layer, the moisture content of the mixed wood and resin is maintained practically constant and uniform throughout the pressing operation. In other words, the compressed margins or edges act as a seal to prevent the escape of moisture and the moisture content is kept uniform throughout the layer being pressed. There is therefore no tendency to warping or curling after the pressing operation has been completed due to uneven moisture loss with consequent shrinkage of areas of relatively great moisture loss. Further, at a temperature of at least 280° F., a pressure of at least 150 pounds per square inch and a moisture content of at least 5%, and when the pressure has been correlated with the moisture content as described hereinbelow, the wood particles are rendered plastic and flow so as to form a board characterized by low porosity, high strength and resistance against chipping, in spite of the relatively small amounts of resinous binder present in the board. In this connection it should be mentioned that since the resinous binder flows under the temperature and pressure conditions maintained during the pressing operation, the resinous binder is distributed over the wood particles in a manner that utilizes more fully the binding properties of the resin. Finally, when the moisture content has been correlated with the pressure as disclosed hereinbelow, there is little or no tendency to blister when the pressure is released slowly after completion of the pressing operation.

The board or sheet material prepared according to said method is characterized by high strength, cohesiveness (no tendency toward chipping or to the breaking off of small particles, particularly at edges), uniform physical characteristics (strength, rigidity, and the like) from the center of the board or sheet all the way to the edge, freedom from warping, a tendency to swell at higher humidities, if at all, in a direction normal to the plane of a board, a hygroscopicity no higher than ordinary wood, resistance against bending, ability to take paint and other finishes in the same manner as ordinary wood and a capacity for being sawed, nailed, screwed or planed.

The present invention involves an improvement in the method for making the cellulosic board disclosed in said copending applications.

More particularly, the present invention relates to a method of preparing a panel that is partially offset laterally and therefore characterized by a projecting corner portion. The improved method comprises the steps of providing a mixture consisting essentially of disintegrated wood and a resin forming binder and subjecting a layer of said mixture to pressure at an elevated temperature to compress said mixture into a coherent panel of laterally offset shape. In this pressing step, the portion of said layer making up the projecting corner portion is densified or compressed to an extent greater than the immediately surrounding portion whereby the projecting panel corner is rendered more resistant against disintegration, as by chipping. At the same time, the outer margins of the panel are compressed to form a seal against the escape of moisture during the pressing operation, as disclosed in said copending applications. In other words, the projecting corner portion and the outer margins (if not trimmed off) of the resulting panel are characterized by greater density and higher mechanical strength than the remaining portions of the panel. Panels so prepared and characterized by laterally offset portions may be assembled in pairs with their concave faces opposed to each other to define together a composite hollow panel suitable for use, for instance, in wooden doors or cabinets. If desired, reinforcing means may span the interior of such hollow panels.

It is, therefore, an important object of the invention to provide a method for the manufacture of panels having concave or convex faces or laterally offset portions by compression molding of the mixture of granulated wood and a resinous binder in which projecting corner portions of the panels are compressed or densified more than the surrounding portions.

Other and further objects and features of the present invention will become apparent from the following description and appended claims taken in conjunction with the accompanying drawing which shows, by way of illustrative examples, apparatus for practicing the methods of the invention and material being processed in various stages. More particularly:

Figures 1, 2:
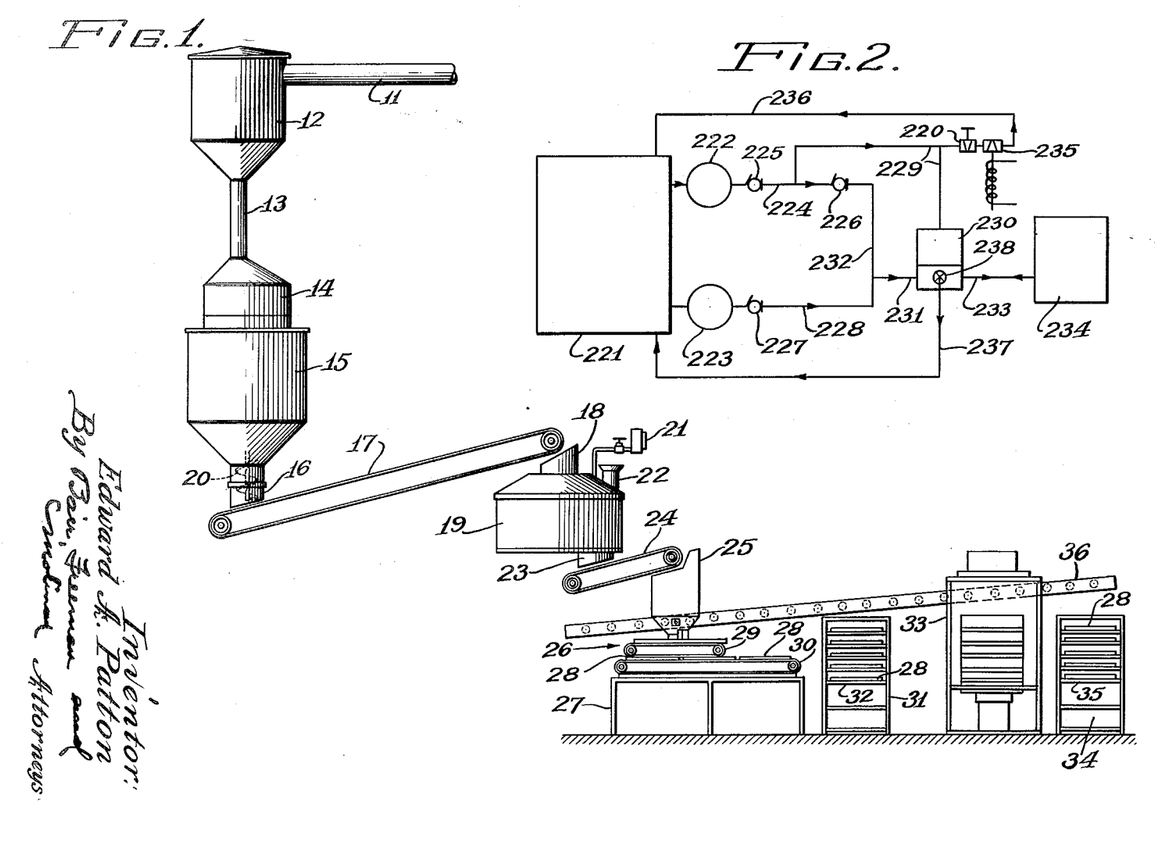
Figure 1 is a diagrammatic view of apparatus utilized for effecting a complete process in the manufacture of wood panels according to the present invention from granulated wood or cellulose products.
Figure 2 is a diagrammatic view of the hydraulic system used for the hot press, forming part of the apparatus of Figure 1.

Referring specifically to Figure 1 of the drawing, numeral 11 designates a conduit which conveys, preferably, waste material from a dust collector system. The waste material may be derived from millwork operation and may contain a high percentage of knot sections. For example, the waste may consist of about 50% machine waste and about 50% knot sections.

The refuse or waste is delivered by the conduit 11 to a cyclone 12, which is preferably equipped with a magnetic separator (not shown) to remove any metal therefrom, which may cause sparks and possibly a fire. From the cyclone 12, the material is delivered through a conduit 13 to an ordinary commercial hammermill 14 which pulverizes or granulates the waste material and is equipped with a suitable screen (not shown) to deliver pulverized waste directly into a storage bin 15. This part of the process is continuous, the remainder being accomplished by batch method. The storage bin 15 may be provided with an automatic shut-off device (not shown), which shuts off the delivery of waste through the conduit 11, when a predetermined level has been reached in the bin 15.

The pulverized material is fed through an outlet 16 from the bin 15 to a belt conveyor 17. A screw conveyor 20 is provided in the outlet conduit 16, and the belt conveyor 17 and screw conveyor 20 are synchronized electrically by any suitable means to introduce a predetermined amount of pulverized material into a waste measure 18. An automatic water valve 21 delivers a predetermined amount of water to each measured batch of pulverized material which is delivered to a muller or mixer 19. An inlet funnel 22 also communicates with the muller 19 and a predetermined amount of powdered or liquid resin, or other binder, is added to each measured batch of pulverized material. After mulling, the resulting mixture is then dumped onto a belt conveyor 24 through an outlet conduit 23 and is delivered to a hopper 25 of the mold-filling machine.

From the hopper 25, the pulverized and mixed material is delivered to a belt system, which is generally indicated by the numeral 26. The entire mold-filling machine is supported on a table 27, and the female mold halves, which are filled by the machine, are shown generally at 28. A continuous belt 29 and a second continuous belt 30 are provided for conveying the pulverized mixed material to the molds and for conveying the molds to a loading rack 31, respectively. It will be noted that the loading rack is provided with a number of shelves or supports 32 for the molds 28. From the loading rack 31, the molds are delivered either by manual or mechanical means to a hot press generally indicated at 33. The hot press itself is of modified standard design, and pressure is applied to the material in the molds while at the same time the material is heated. When the compression step is completed, the molds with the compressed material therein are delivered to an unloading rack 34, which likewise has a number of shelves 35 for the reception of the molds 28. The molds are then removed from the rack 34, either manually or mechanically, and the compressed material is taken out of the molds by inverting them. The inverted molds 28 are then placed on the gravity roller conveyor 36 which terminates adjacent the mold loading mechanism.

Figure 3:
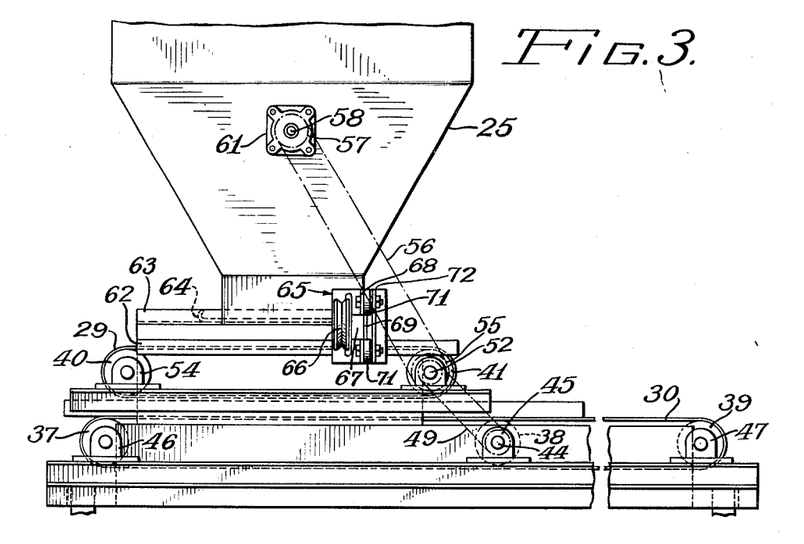
Figure 3 is a side elevational view of the mold-filling machine forming part of the apparatus of Figure 1.
Figure 4:
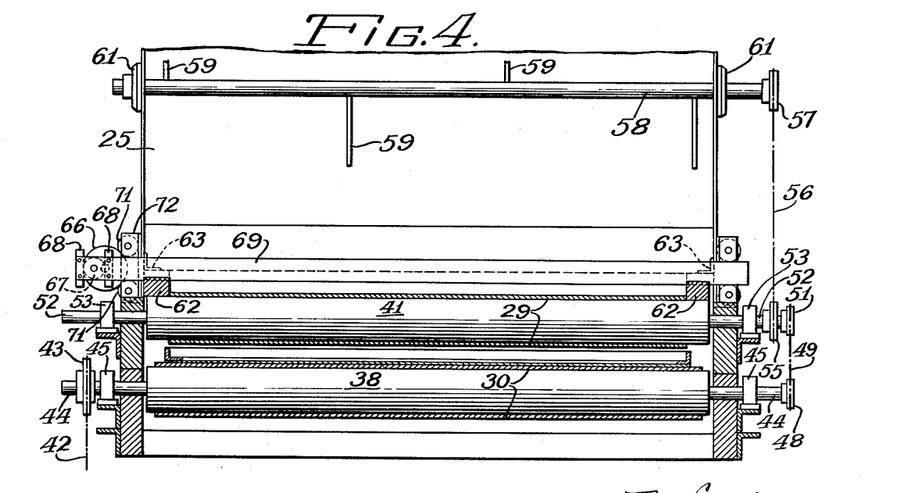
Figure 4 is a partial sectional view of the machine shown in Figure 3.

Referring specifically to Figures 3 and 4 of the drawings for a detailed description of the mold-filling machine, it will be noted that three rollers 37, 38 and 39 are provided for guiding and driving the lower continuous belt 30. Two rollers 40 and 41 are provided for guiding and driving the upper continuous belt 29. The roller 38 for belt 30 is driven by a chain 42 which engages a sprocket 43 connected to a shaft 44 for the roller 38. Bearings 45 are provided on each side of the machine for the shaft 44. The chain 42 is driven from any suitable source of power, such as an electric motor (not shown).

Two additional sets of bearings 46 and 47 are provided on each side of the machine for the rollers 37 and 39, respectively.

The shaft 44 for the roller 38 is provided with a sprocket 48 at one end thereof, which drives a chain 49 engageable with a sprocket 51 which is secured to a shaft 52 for the roller 41. A bearing 53 is provided at each side of the machine for the shaft 52 and a bearing 54 is provided at each side of the machine for the shaft of the roller 40.

A second sprocket 55 is secured to a shaft 52 and drives a chain 56 which engages with a sprocket 57 secured to a shaft 58 for driving a stirring device having stirring rods or fingers 59. The rotation of the fingers 59 maintains the mixed pulverized material in the hopper 25 in loose condition so that it will fall by gravity onto the belt 29. Bearings 61 are provided on each side of the machine for the shaft 58 of the mixing device.

A member 62 is provided at each side of the machine adjacent the upper reach of the belt 29, in order to guide the belt and also to prevent mixed pulverized material from spilling off the sides of the belt. Angle irons 63 are secured to the hopper 25 and a slide 64 is guided by the angle irons 63. Obviously, the slides 64 may be moved to open or close the outlet from the hopper 25 to the desired extent, so that approximately the proper amount of mixed pulverized material will be delivered to the belt 29.

A doctor bar assembly is shown generally at 65 and comprises a pulley 66 adapted to be driven by a V-belt (not shown) from any suitable source of power, preferably the same electric motor that operates the other parts of the mold-filling machine. A rotatable ball bearing member 67 is eccentrically connected to the pulley 66, and a pair of guide members 68 are engaged by the ball bearing member 67 to impart reciprocating motion to the doctor bar 69 to which the guide members 68 are secured. The doctor bar 69 is reciprocated between rollers 71 provided on both sides of the machine. The rollers are supported in a pair of brackets 72. The doctor bar 69 is preferably serrated.

The molds of this invention define therebetween a mold cavity including two laterally offset portions connected by an inclined portion. The mold cavity is constricted at two areas, viz. at the outer margins and where the inclined portion merges with the inner offset portion. In the case of the outer margin, such construction can be brought about either by convergence of the opposed walls defining the inclined portion of the mold cavity or by offsetting the outermost portion of either mold half to bring the two mold halves into closer approximation. In the case of the constricted portion at the transition to the inner offset portion of the mold cavity, constriction is brought about by forming either or both mold haves with a projecting rib defining a constricted area towards which the opposed mold surfaces converge both from the outside and from the inside.

Figure 5:
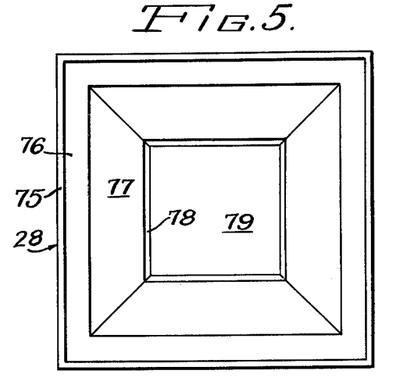
Figure 5 is a plan view of a female mold half adapted to be filled by the machine of Figures 3 and 4, and suitable for use in the apparatus of Figure 1, for forming a panel according to the present invention.
Figure 6:
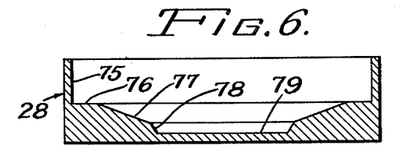
Figure 6 is a vertical cross-sectional view through the mold of Figure 5.

Referring now to Figures 5 and 6 for a detailed description of the female mold halves 28, these molds are formed, preferably, of aluminum because of its lightness and heat conductivity. Furthermore, there is very little tendency for the compressed material to stick to the aluminum surface. Obviously, however, other metals may be used for the molds, such as brass or iron.

The mold 28 is formed with an erect side wall 75, an annular flat or level surface 76, a gently sloping annular surface 77, a relatively more steeply inclined and shorter annular surface 78 and a central circular flat or level surface 79. In other words, the mold 28 comprises an annular level surface 76 immediately inside the side walls 75 together with an offset central circular flat surface 79, these two offset surfaces being connected together by the two inclined surfaces 77 and 78 defining a reentrant angle in so far as the mold cavity is concerned.

Figure 7:
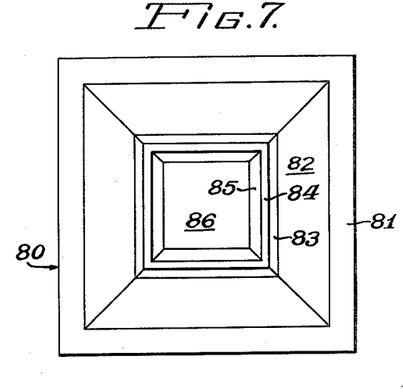
Figure 7 is a bottom plan view of a male mold half suitable for use with the mold of Figures 5 and 6.
Figure 8:
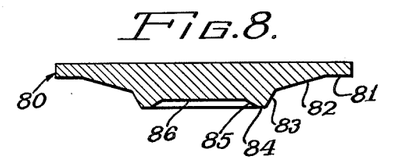
Figure 8 is a vertical cross-sectional view through the mold of Figure 7.

Figures 7 and 8 show the male mold half as having an underside formed with an outermost flat or level annular surface 81, a gently sloping annular surface 82, a relatively short and more steeply inclined annular surface 83, a lowermost flat or level annular surface 84, an inclined annular surface 85 and a central circular flat or level surface 86. Thus, the general shape of the mold half 80 may be described as including an outermost flat or level annular surface 81 and a central recessed flat or level surface 86 bounded by a projecting rib having inclined side surfaces 83 and 85 as well as a flat end surface 84, the outer rib surface 83 being joined to the flat annular surface 81 by an inclined surface 82 defining, with the rib side surface 83, a reentrant angle.

Figure 9:
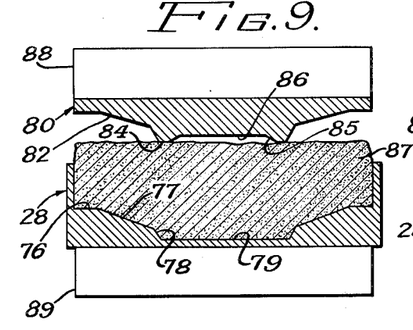
Figure 9 is a vertical cross-sectional view, showing the two mold halves of Figures 5 through 8 with the female mold half filled and before the material in the female mold has been compressed.
Figure 10:
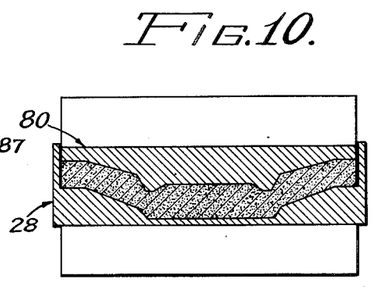
Figure 10 is a view similar to Figure 9, but showing the granular material in the mold in an intermediate stage of compression.
Figure 11:
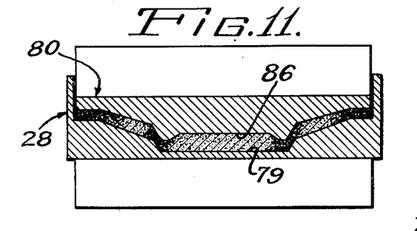
Figure 11 is a view similar to Figure 10 but showing the granular material as fully compressed into panel form.

The coaction between the two mold halves 28 and 80 will be apparent from Figures 9 through 11 showing, respectively, the female mold 28 filled with granulated material to be molded before the male mold has contacted the granular material, the granular material as partly compressed in an intermediate stage of the closing of the mold or die and the mold halves in the position reached when the pressure has been fully applied and the granular material has been compressed into the form of the desired panel. In these three figures, the upper head of the press 33 has been indicated by the reference numeral 88, the lower head of the press with reference numeral 89, and the granular material by the reference numeral 87. Attention is directed to the fact that the surfaces 77 and 82 terminate inwardly and outwardly at about the same distance from the center of the mold, but that these two surfaces diverge inwardly. The two surfaces 78 and 83 likewise terminate inwardly and outwardly at the same distance from the center of the mold, but these two surfaces diverge outwardly. As the male mold 80 first is depressed into the granular material 87, the latter may be displaced outwardly to limited extent. When the position illustrated in Figure 10 has been reached, very little, if any, further displacement of the granular material is possible. As a result, in the further approachment of the two mold halves, certain parts of the granular material will be more compressed than other parts. These more highly compressed portions include those between the surfaces 76 and 81 and those between the surfaces 78 and 83 and the surfaces 84 and the opposed portion of the surface 79 where the granular material has been compressed, say, to 1/12 of its original thickness, while in other portions, the compression may be only to 1/6 of the original thickness. It will be noted that, as shown in Figure 11, the surfaces 79 and 86 and the inner portions of the surfaces 77 and 82 are spaced further apart than the other opposed surfaces. As a result, the panel formed between the molds or dies 28 and 30 shown in Figure 12 and there indicated by the reference numeral 90 will include a flat or level outer margin 91, an intermediate annular inclined web portion made up of an outer inwardly diverging part 92 and an inner inwardly converging portion 73 together with a central offset portion 94 having its inner face formed with an offset portion 95. The outer margin will be relatively more dense than the web portion 92 and the outer part of the web portion 93. This outer relatively dense portion is indicated by the reference numeral 96. Further, another relatively dense area 97 is located at the corner forming the transition from the inner web portion 97 to the margin of the offset portion 94. The relatively dense areas 96 and 97 are characterized by smaller thickness than the remainder of the panel 90. Thus, the panel 90 may be characterized as having laterally offset portions, the projecting corner portions being relatively denser than adjacent areas. Further, the outer margin is relatively more dense than the immediate adjacent area. Of course, if desired, this outer dense margin may be trimmed off.

Figure 13:
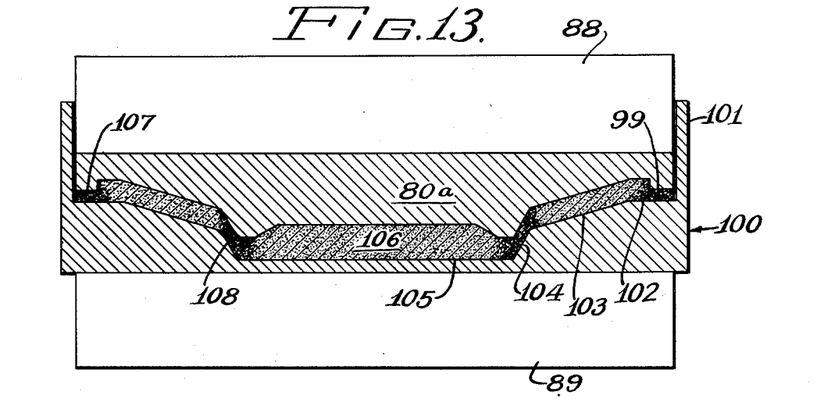
Figure 13 is a view similar to Figure 11 but showing a female mold half of somewhat different shape.

Figure 13 shows a mold assembly somewhat similar to that shown in Figures 9 through 11. In the latter figures, the sealing of the outer margin of the layer of granular material being compressed is brought about by the convergence outwardly of the surfaces 77 and 82, the surfaces 76 and 81 being parallel. In the mold assembly of Figure 13, on the other hand, a male mold half is formed with a rabbetted annular surface immediately inside the side wall, so that the outermost portion of the granular layer being compressed is densified more than the portion immediately inside thereof. More particularly, the assembly of Figure 13 includes the male mold half 80a of the same shape as the male mold of Figures 9 through 11 except for the provision of an outermost downwardly extending rib having a terminal annular surface 99 together with the female mold half 99 formed with an outer side wall 100, an annular level or flat surface 101, a second annular level or flat surface 102 offset downwardly from the surface 101, an inclined annular surface 103, a second and more steeply inclined annular surface 104 and a central circular flat or level surface 105. The two annular surfaces 82 and 103 are parallel. The surfaces 81 and 101 are so spaced that the granular material therebetween will be compressed to from 40% to 60% of the thickness of the material between the surfaces 81 and 102. The finished panel which is indicated generally by the reference numeral 106 will, therefore, include two densified areas, viz., the corner area 108 and the area 107 forming the outer margin of the panel. If desired, this outer densified area 107 may be trimmed off.

Figure 14:
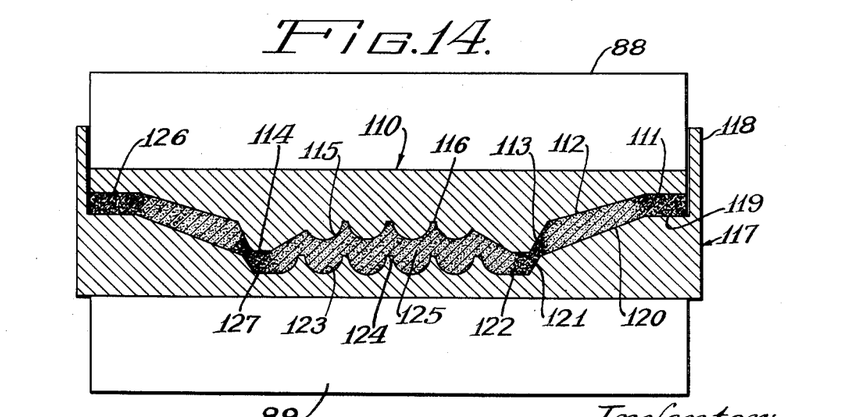
Figure 14 is a view similar to Figure 11 but showing molds for forming a panel having a central offset area formed with a plurality of parallel ribs and grooves.

In Figure 14, I have shown a mold assembly for preparing panels having a central offset portion formed with a plurality of alternating ribs and grooves. As shown, the male mold half generally indicated at 110 has an underside formed with an outer level or flat annular surface 111, an inclined annular surface 112, a second more steeply inclined annular surface 113, a flat or level annular surface 114 and a plurality of ribs 115 alternating with grooves 116. The female mold half generally indicated at 117 includes an upstanding side wall 118, a flat or level annular surface 119, an inclined annular surface 120, a second and more steeply inclined annular surface 121, a flat or level annular surface 122 and grooves 123 alternating with ribs 124. The ribs 115 are opposed to the grooves 123, while the grooves 116 are opposed to the ribs 124. The finished panel is indicated by the reference numeral 125 and includes an outer dense area 126 and a densified corner area 127 (similarly to the panel 90) together with alternating ribs and grooves within the central offset area.

Figure 15:
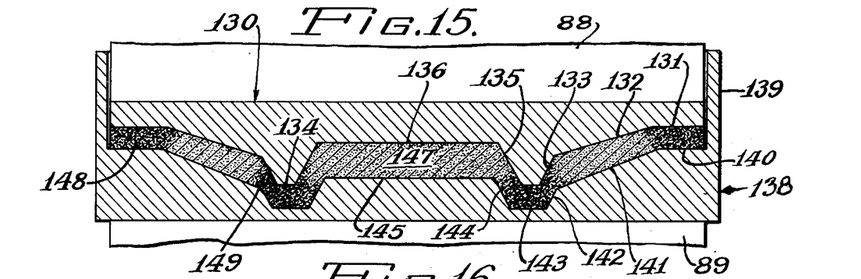
Figure 15 is a view similar to Figure 11 but showing molds of somewhat different shape for forming a panel having a central offset area surrounded by a projecting rib.

Figure 15 shows still another mold assembly for making a panel characterized by a central offset portion within an annularly projecting rib. The male mold half is generally indicated by the reference numeral 130 and has an underside formed with a flat or level annular surface 131, an inclined annular surface 132, a second and more steeply inclined annular surface 133, a flat or level annular surface 134, and a third inclined annular surface 135 surrounding a central circular flat or level surface 136 intermediate in level between the flat or level annular surfaces 131 and 134. The female mold half is generally indicated by the reference numeral 138 and includes an outer side wall 139, a flat or level annular surface 140, an inclined annular surface 141, a second and more steeply inclined annular surface 142, a flat or level annular surface 143, and a third inclined annular surface 144 surrounding a central circular flat or level surface 145 intermediate in level between the annular surfaces 140 and 143. The resulting panel is generally indicated by the reference numeral 147 and includes an outer densified area 148 together with an annularly formed rib having its outer corner densified as indicated at 149. The densified areas of the panel 147 are formed similarly to the densified areas of the panel 90 of Figure 12.

Figure 12:
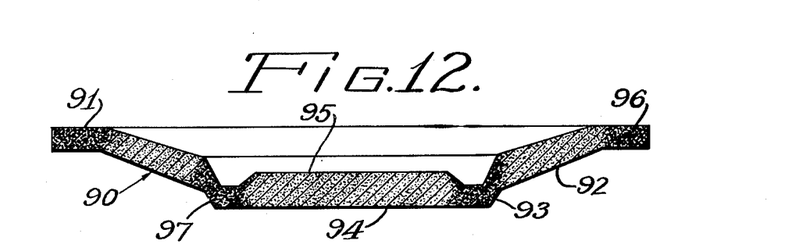
Figure 12 is a vertical cross sectional view of a panel formed in the mold of Figures 5 through 8.
Figure 16:
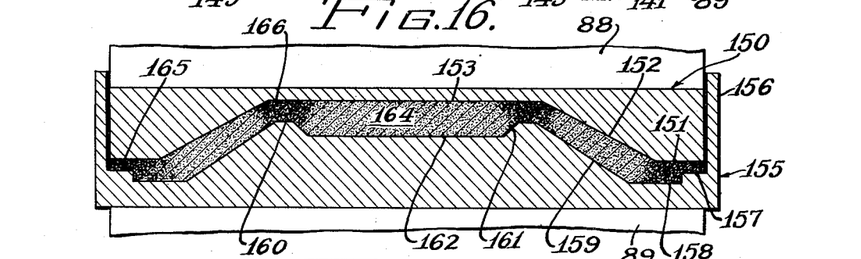
Figure 16 is a view similar to Figure 11 but showing molds of somewhat different shape for making a panel generally similar to that of Figure 12 but having constricted margins.

In Figure 16 I have shown still another mold assembly generally characterized by the fact that the male mold member includes a central shallow recess while the central female mold half bulges centrally, so that a panel somewhat similar to that shown in Figure 12, can be formed. The male mold half generally indicated by the reference numeral 150 has an underside formed with a flat or level annular outer surface 151, an upwardly inclined annular surface 152 and an upwardly offset central circular flat or level surface 153. The female mold half generally indicated at 155 includes an outer side wall 156, a flat or level annular surface 157, a second downwardly offset flat or level surface 158, an inclined annular surface 159, a third flat or level annular surface 160 upwardly offset from the surface 157, and an annular inclined surface 161 surrounding the central circular flat or level surface 162 intermediate in level between the surfaces 157 and 160. The surfaces 152 and 159 converge inwardly. The finished panel indicated by the reference numeral 164 includes an outer densified area 165 formed between the surfaces 151 and 157 and a densified corner area 166 formed between the surfaces 152, 153, 159 and 160.

Figure 17:
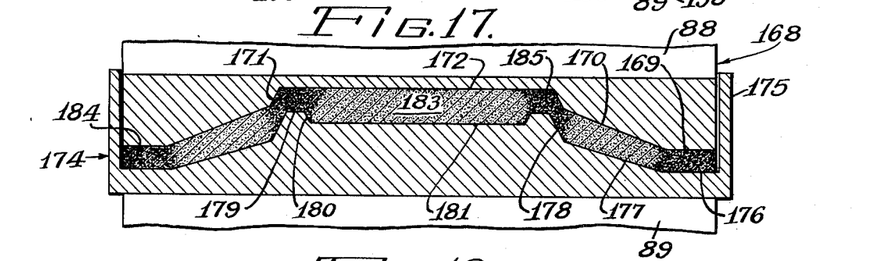
Figure 17 is a view similar to Figure 11 but showing molds of somewhat different shape for making a panel similar to that shown in Figure 12.

Figure 17 shows still another mold assembly somewhat similar to that of Figure 16. A male mold half generally indicated at 168 has an underside formed with an outermost flat or level annular surface 169, an inclined annular surface 170 and a second relatively more steeply inclined annular surface 171 surrounding a central circular flat or level area 172 offset upwardly from the surface 169. A female mold half generally indicated at 174 has an outside wall 175, a flat or level annular surface 176, an inclined annular surface 177, a second relatively more steeply inclined surface 178, a flat or level annular surface 179 offset upwardly from the surface 176, a downwardly sloping annular surface 180 and a central circular flat or level surface 181 intermediate in level between the surfaces 176 and 185. The finished panel indicated by the reference numeral 183 is characterized by an outer densified area 184 and a projecting densified corner portion 185. Relatively greater density of the outer area is brought about by the outward convergence of the surfaces 170 and 177, while the density of the inner projecting corner portion is brought about by the convergence of the surfaces 171 and 178.

Figure 18:
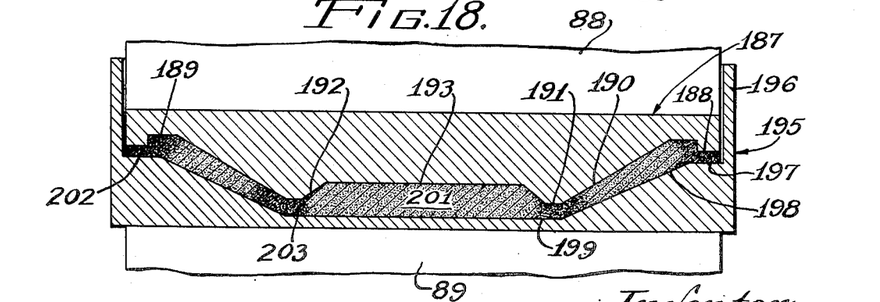
Figure 18 is a view similar to Figure 11 but showing molds of somewhat different shape for making a panel similar to that formed in the mold of Figure 16.

In Figure 18 I have shown still another mold assembly including a male mold half generally indicated at 187 having an outer flat or level annular surface 188, a second flat or level annular surface 189 offset upwardly, an inclined annular surface 190, the third flat or level annular surface 191 offset downwardly from the surface 188, and an inclined annular surface 192 surrounding a central circular flat or level surface 193 offset upwardly from the surface 191 to a level short of that of the surface 188. A female mold half generally indicated 195 has an outside wall 196, a flat or level annular surface 197, and an inclined annular surface 198 surrounding a central circular flat or level area 199 offset downwardly from the surface 197. The finished panel indicated by the reference numeral 201 includes an outer densified area 202 formed between the surfaces 188 and 197 and a densified corner area 203 formed between the surfaces 190, 191, 198 and 199. The surfaces 190 and 198 converge inwardly, for bringing about the densification of the area 203.

In all of the molds shown in Figures 5 through 18, the outer marginal area of the layer being compressed is densified due to the fact that the outermost margins of the opposing mold halves approach each other more closely than the adjacent portions of the mold halves. For this purpose, the opposed mold surfaces about the margins converge outwardly, either angularly or by inward offsetting of the outermost surfaces. Further, the projecting corners of the panels are densified due to the fact that the two mold halves are formed with annular converging surfaces at least one of which terminates in an annular surface in closer proximity to the opposed mold half than the immediately surrounding areas.

The single panels prepared by the molds of Figures 5 through 18 may be characterized as including a central laterally offset portion and also as each having a concave and convex broad face. These panels may be used per se for any desired purpose, such as side walls for cabinets. The panels may also be combined in pairs with their concave faces opposed to form composite hollow panels suitable, for instance, for use in the construction of doors.

The following materials have been found to provide a very satisfactory panel formed of compressed wood or other cellulose type material. Disintegrated wood of any species of tree may be used. Very satisfactory results have been obtained with pine wood. Preferably at least 50% of the wood is disintegrated to a 16 to 40 mesh particle size.

The resin employed is preferably one having a flow point not higher than 125° C. The resin may be a thermosetting resin capable of flowing for an appreciable period of time before it is cured or set in the press and capable of acting as a bonding agent for the wood particles. We prefer to use a resin having a curing time of from 40 to 100 seconds at 150° C. Resins of various chemical compositions share these characteristics. We can use, for instance, resins of the phenolformaldehyde type or the urea-formaldehyde type, or furfural resins and the like. Obviously, resins characterized by excessive tendency to absorb water or by insufficient resistance to weathering agents or having other undesirable characteristics should not be employed.

We have successfully used, inter alia, three phenolformaldehyde resins characterized by the following flow points and cure times:

| Resin | Seconds Cure at 150° C. | Flow Point, ° C. |
|---|---|---|
| A | 80–100 | 110–125 |
| B | 45 | 85–90 |
| C | 55–65 | 95–105 |

It is understood that the thermosetting resins herein referred to are capable of curing or setting under the conditions of the pressing operation. In other words, the binding agents employed may or may not be resinous when initially incorporated with the granulated wood but are definitely present as resins in the finished panels. We may therefore employ binding compositions made up of resin-forming materials in any resin-forming stage short of the final or cured or set stage. The resinous binding agent may be employed in wet or dry condition. We prefer to use a solid finely pulverized resin-forming composition, since such products are most easily and most uniformly blended or mixed with the wood particles. Nevertheless, we can also employ moist or dissolved or dispersed resin-forming compositions, due regard then being had for the moisture content of the resin-forming composition when making up the mixture to be pressed.

The amount of resin employed may range upwardly from 4% or 5% of the mixture being pressed. We prefer to employ from 5% to 8% resin. When a dry powdered phenolformaldehyde resin is used, very satisfactory results have been obtained at a resin content of from 6% to 7%. Blistering occurs at resin contents of about 14% or higher, for such high resin contents apparently prevent the free escape of steam from the dense boards when the press is opened. We prefer to keep the resin content at from 5% to 8%. Obviously, the exact amount of resin to be used will vary somewhat according to the specific nature of the particular resin being used. In general, more resin is used when the wood is more finely disintegrated.

The water content of the pressing mixture is maintained at from 5% to 25%, depending on the pressure employed in the pressing operation. At lower moisture contents, the panels obtained are characterized by excessive thickness, structural weakness, excessive porosity, the presence of voids in the interior of the panel and by pitted surfaces, even when relatively high pressures are used. At moisture contents in excess of 25% there is a tendency for the panels to stick or adhere to the mold walls and to the formation of blisters or even explosive disintegration of the panel on release of the pressure, whether or not such release is accomplished slowly, if sufficient pressure has been used to form a firm panel. The correlation between the moisture content and the pressure is discussed hereinbelow. Wood waste accumulated from millwork operations commonly contains about 6 to 8% moisture. This moisture content is taken into account when the total moisture content of the pressing mixture is calculated.

It should be understood that besides the above enumerated ingredients, other materials may also be incorporated with the pressing mixture. Such added material may include pigments such as titanium dioxide, iron oxides and the like, inert fillers such as chalk or barium sulfate, materials commonly used as fillers or extenders for resins, finely divided carbon and many other materials.

The above disclosed ingredients of the pressing mixture are mixed with each other at a temperature below the flow point of the resin.

The pressure applied during the hot pressing operation ranges from 150 to 400 pounds per square inch or higher but does not exceed 500 lbs. per square inch. The pressure is correlated with the moisture content of the pressing mixture according to the following table:

| Pressure in pounds per square inch | Broad Range | Moisture Content Preferred Range | Example |
|---|---|---|---|
| | *Percent* | *Percent* | *Percent* |
| 150 | 20-25 | 22-25 | 25 |
| 200 | 15-25 | 17-23 | 20 |
| 300 | 10-20 | 12-18 | 15 |
| 400 | 5-15 | 7-13 | 10 |
| >400 | 5-10 | 5-8 | 7 |

The correlation between the moisture content of the molding mixture and the pressure may also be tabulated as follows:

| Moisture Content in Percent | Pressure in Pounds Per Square Inch | |
|---|---|---|
| | Minimum | Maximum |
| 20-25 | 150 | 200 |
| 15-20 | 200 | 300 |
| 10-15 | 300 | 400 |
| 5-10 | 400 | 500 |

The exact pressures and moisture contents to be employed will vary, within the tabulated limits, according to a number of factors such as the thickness, strength and density required or desired in the finished panel. Obviously, these characteristics vary according to the end use of the finished panel. Further, moisture contents and pressures will vary somewhat, within the tabulated limits, according to the nature and prior preparation of the wood, the nature and amount of specific resin employed, and like factors. In making panels suitable for most, if not all purposes, on a large scale, we prefer to use a pressing mixture containing from 12 to 15% moisture, and to press this mixture at from 300 to 400 pounds per square inch, using a powdered phenol-formaldehyde resin as binding agent in an amount ranging from 5 to 8%. Thus, a batch of material to be pressed may have the following composition:

86.3% by weight pulverized mill waste
7.7% by weight water
6.0% by weight powdered phenol-formaldehyde resin having a flow point of 110°–125° C. and a cure time of 80–100 seconds at 150° C.

An example of the influence of the prior treatment of the wood as influencing the effect of the moisture content is given as follows: If, for any reason, the wood used in making up the above tabulated specific mixture has become heated and somewhat dried out in the hammermill as when large or particularly tough wood particles are fed to the hammermill, the moisture content of the disintegrated wood may be reduced, say to 5½%. Then, when pressing is carried out at from 300 to 400 pounds per square inch and a temperature of 338° F., the resulting panel may be characterized by weight of 28 pounds (per unit area) and a thickness of $\frac{11}{32}$″, even though the total moisture added to the press mixture is the same as that of a press mixture made up of wood that has not become heated and lost moisture in the hammermill and which yields a panel having a thickness of $\frac{5}{16}$″ and weighing 25 pounds (per unit area). In other words, such a relatively small reduction in moisture content of the wood in the hammermill will lead to a disproportionately large amount of wood being fed into the mold even though the total moisture content of press mixture has been maintained constant. In the preparation of $\frac{5}{16}$″ panel from wood that has become heated and somewhat dehydrated in the hammermill, we therefore prefer to incorporate with the press mixture (such as a specific mixture described hereinabove) an additional pound of water over and above the amount that would otherwise have been employed. We find that the addition of this one pound of water cuts off $\frac{1}{32}$″ from the thickness of the resulting panel and reduces the weight of the panel from 28 to 25 pounds (per unit area). In other words, a 1% increase in water content brings about a 12% reduction in the weight and thickness of the resulting panel. Note that the panels prepared from the two pressing mixtures differing only in moisture content are both satisfactory, although, for a specific purpose, one panel may be preferred. Similar results can be obtained by other variations in moisture contents within the tabulated limits.

As explained hereinabove, the pressure is at least sufficient, at the prevailing moisture content and temperature, to cause the wood to be plasticized and at the same time not great enough to cause blistering when the pressure is released slowly.

The temperature of pressing is at least 280° or 300° F. A temperature of 338° F. insures very satisfactory results with the above disclosed specific mixture. In general, the temperature must be sufficient to bring about curing or setting of any thermosetting resin employed. The time of pressing should be sufficient to bring about curing or setting at the prevailing temperature. Ordinarily, from about 3½ to 10 minutes' pressing time is sufficient. With the above disclosed specific mixture, a pressing time of 5 minutes has been found satisfactory. The full pressure should be applied at the beginning of the pressing operation, to insure flow of resin before the resin is cured or set. When longer pressing times and higher temperatures are employed, the resulting panel material will be more stable dimensionally under varying humidity conditions, i. e., the material is less hygroscopic.

The pressure is applied for a period of time to compress the layer of molding mixture to its final dimensions. If desired, the full pressure can be applied throughout the whole molding operation, although very good results have also been obtained by slowly reducing the pressure to a lower value as soon as complete compression has been effected.

The molds may be coated with magnesium stearate to prevent adherence. For the same purpose, the molds may be preheated, say, to 150° to 175° F. before the press mixture is introduced.

In the pressing operation, the margins on the layer being pressed are compressed to about 40% to 60% of the thickness of the middle portions of the finished panel. Some warping tendency is evident if the margins are compressed to less than 60% of the thickness of the remainder of the board. Wood cannot be compressed to less than about ⅓ of its original thickness. Hence, when the edges or margins have been compressed to about ⅓ of the thickness of the remaining portions of the panel, these margins act as stops preventing further compressing of the middle of the panel. Preferably, the margins are compressed to about 45% to 55% of the thickness of the middle portions of the panel. In the case of the above disclosed specific mixture, very satisfactory results have been obtained by compressing the margins to one-half of the thickness of the remaining portions of the panel. In the case of a panel 4 ft. square, compressed margins 1″ wide function very satisfactorily to seal the moisture content of the pressing mixture.

In the case of the densified projecting corner portions, the limit for the possible compression is set by the fact that wood cannot be compressed to less than about ⅓ of its original thickness. Preferably, the projecting corner portions are compressed to about 45 to 55% of the thickness of the middle portions of the panel.

To prevent darkening, either of the whole panel (excluding the densified sealing edge or margin) or parts thereof, and to permit uniform absorption of oil stains and the like, the pressing operation is conducted so that no significant decomposition or other chemical changes are effected in the wood particles during the pressing step. For this purpose, the molding pressure is kept below 500 pounds per square inch at said elevated temperature and the full molding pressure is applied for less than 10 minutes, at least when the pressure ranges between 400 and 500 pounds per square inch. At pressures below 400 pounds per square inch, the pressure may be applied for longer periods than 10 minutes. Finally, the temperature is also kept below levels causing discoloration of the wood and reduced stain absorption. More particularly, temperatures up to about 360° F. are safe at pressures below 500 pounds per square inch applied for less than 10 minutes. At pressures less than 400 pounds per square inch, temperatures higher than 360° F. may be used, say, up to 400° F. However, as long as the flow point of the resin-forming binder is exceeded by about 80° to 100° F., no particular advantage is gained by further raising the temperature.

It should be noted that the above disclosed restrictions as to pressure and time apply only to the conditions under which the present method is carried out, i. e., where the margin of the layer of granulated wood-resin mixture is densified to form a seal retaining moisture within the molding mixture inside said densified margin. In this case, the margin is densified to almost or about the limit of its compressibility, while this is not true of the material inside said margin. The latter material is not densified as much as the margin. The densified margin (which is subsequently trimmed off) is usually darkened and characterized by reduced capacity for absorbing oil stains or the like, as compared with the material within the margin. Thus, the step of compressing the margins more than the rest of the layer being molded serves not only to form a seal against the escape of moisture but the heavily densified margin material also serves as a stop preventing similar heavy compression of the material within the margin which otherwise would be darkened and have its ability to absorb oil stains reduced. In other words, the heavy densification of the marginal material permits the applications of relatively high over-all compressing forces which would cause over-all darkening and other undesirable changes in the compressed board in the absence of such marginal densification.

By way of a specific example, the mold of Figures 5 through 8 may be 6 inches square and may be filled with 150 grams of mixed wood and resin which is compressed under an average pressure of 300 pounds per square inch.

Referring specifically to Figure 2 of the drawings, a hydraulic system for operating the hot press 33 is there shown. The hydraulic system is conventional in its make-up, with the exception of the fact that a needle throttling valve 220 is provided for a purpose to be described.

The system comprises an oil supply tank 221, to which is connected a high pressure pump 222 and a high volume pump 223. A pipe line 224 is connected with the outlet of the high pressure pump, and has two normally closed valves 225—226 therein. A normally closed check valve 227 is provided in an outlet pipe 228 from the high volume pump 223. A pipe line 229 is connected between the valves 225 and 226 to a cylinder drain valve chamber 230. Likewise, a pipe 231 is connected to a pipe 232 extending between the valves 226 and 227 and pipe 231 is also connected to the cylinder drain valve chamber 230. A pipe 233 then connects the cylinder drain valve chamber 230 with a hydraulic piston 234, which provides the required pressure for the hot press 33.

The press 33 and the hydraulic system are provided with a standard electrical timer (not shown) which maintains a high pressure on the hydraulic piston 234 until the pressing is completed. At this time, a solenoid operated valve 235 is partially opened. The needle valve 220 functions as a pilot valve for the valve 235 and is adjusted so as to provide a very small opening. The high pressure hydraulic fluid from the hydraulic piston 234 slowly passes back through the pipe 233, through one branch of the pipe 229, through the needle valve 220, through the partially opened solenoid operated valve 235 and back to the oil supply tank through a pipe 236. Since the valve 220 is so adjusted as to permit the fluid to flow slowly into the main valve, a number of seconds will elapse while the initial pressure is being reduced. As soon as the pilot valve 220 is full of hydraulic fluid, the main valve 235 is opened completely and the press opens rapidly. A pipe 237 having a hand valve 238 therein, connects the cylinder drain valve chamber 230 with the oil supply tank 221 for the obvious purpose of draining the cylinder of the hydraulic piston 234 when desired.

Since there is considerable internal steam or superheated water in the panel 90 during the pressing process, the panel 90 is liable to blister or explode if the press is permitted to open instantaneously. With the needle valve 220 installed as shown, and adjusted to a very small opening, the high pressure oil is forced to pass through the small opening when the solenoid valve 235 trips or opens. Therefore, several seconds are required for the pressure to be reduced on the press 33, thus causing a gradual release of pressure in the panel and eliminating blistering and possible exploding of the panel 90.

The operation of the apparatus and process has already been described up to the time that the mixed pulverized material is delivered to the hopper 25. Also, as stated before, the mixing device 59 maintains the granulated material in loose form. The slide 64 is first adjusted to control the amount of mixed pulverized material which is to be delivered to the belt 29. Obviously, the thickness of the material which is eventually delivered to the mold 28 will primarily control the thickness of the finished panel 90. The molds 28 are filled with pulverized material by delivering a predetermined thickness of the material onto the belt 29 carried by the two upper rollers 40 and 41. The belt 29 carries the material toward the right as viewed in Figure 3, so that the material is discharged from the right hand end of the upper reach of the belt 29 into the molds 28. The molds 28 are carried along successively toward the right or toward the left as viewed in Figure 3, by the upper reach of the lower belt 30. As stated before, the belt 30 is carried and driven by the three lower rollers 37, 38 and 39. The speed of the belts 29 and 30 is synchronized to deliver a layer of mixed material of uniform thickness to the molds. When the two belts 29 and 30 move in opposite directions, fine material does not tend to stratify in the molds 28, as may happen when the two belts move in the same direction.

As the material falls from the hopper 25 onto the belt 29, the doctor bar 69 is reciprocated back and forth to smooth out the material and to insure that a layer of the proper thickness is delivered to the molds 28. The doctor bar 69 is adjustable vertically by any suitable means (not shown), in order to vary the thickness of the material which is delivered to the belt 29. Obviously, it is not desired to deliver too much excess material to the belt 29. The slide 64 permits the operator to control this factor.

After the molds have been filled with the material to be compressed, obviously, they are carried into the hot press 33, the male molds being attached to the upper press head 88 so that they may be forced downwardly into each female mold in the pressing operation. As discussed hereinabove, the marginal portion of the panels is compressed considerably more than the adjacent portions, producing a dense edge around the panels which prevents the escape of an excessive amount of steam and moisture during the pressing process. A seal then is formed around the edge of the panel, which by preventing the escape of moisture, maintains uniform moisture distribution throughout the panel during pressing. Uniform moisture distribution brings about uniform physical characteristics in the finished panel and, in particular, minimizes internal strains in the panel, with consequent elimination of any tendency to bow or curl due to internal strains resulting from unequal distribution of moisture during pressing.

Similarly, the additional compression of the projecting corner portion about a central offset panel area densifies this corner portion and renders the same resistant against disintegration, as by chipping.

From the foregoing it will be apparent that I have provided an improved method and apparatus for forming dense panels from granular or pulverized wood or other cellulose material. The panels prepared as disclosed are made up of wood that has not been modified chemically to a significant extent and of resin in an amount of, say, from 6 to 7%. The panels will have about the same hygroscopic characteristics (tendency to absorb water) as the wood from which the panels have been prepared. The color of the panels is approximately the same as the wood contained therein. It should be noted, in this connection, that the color of the panels is uniform and does not vary locally, as contrasted to the different colors of the sap wood and heart wood of pine and to the local color variations in plywood. The panels prepared from a pressing mixture containing from 12 to 15% moisture at from 300 to 400 pounds' pressure are characterized by moduli of rupture in static bending of from 4000 to 5000 pounds per square inch in all directions. With respect to strength in static bending, these panels are one-half as strong as solid wood, one-half as strong as 3-ply plywood with surface plies running in the long direction and twice as strong as 3-ply plywood with surface plies running crosswise. As to impact resistance these panels compare favorably with ¼ inch pine plywood or fir wood of equal thickness or with solid wood of equal thickness, and greatly exceed many conventional building boards. For comparison with the latter, my panels are distinguished by firmer edges and corners that will not splinter like plywood nor dent as easily as plywood or solid lumber when the boards or edges are treated roughly. The surface of my panels resist denting many times better than pine plywood or solid lumber. My panels shrink or swell but little. For instance, a panel of 3-foot width will swell or shrink only about 1/16 inch with a moisture change of 6%, while a pine plywood panel will swell or shrink 3/32 inch and pine lumber panels will shrink or swell 1/16 inch. My panels are superior to plywood in resistance against warping and not as liable to damage on subjection to elevated temperatures. My panels have surfaces excellently adapted to receive a finish, such as paint, being more absorptive so that the paint will be more firmly bonded thereto, and the paint coats do not show the hair line checks typical of painted veneers, and due to alternate transverse swelling and contraction of oriented cellulosic fibers. The initial paint coat applied to my panels yields a finish similar to painted metal. The surface of my panels accepts readily any color stain and the stain will not bring out any local color variations, as in the case with lumber or plywood. My panels are easily machined, with any woodworking machinery, and can consistently be produced with any desired hardness, color, size or other characteristics.

Changes in composition and procedure may be made without departing from the real spirit and purpose of my invention, and it is my intention to cover by my claims any modified forms which may be reasonably included within their scope without sacrificing any of the advantages thereof.

This application is a continuation-in-part of my application Serial No. 82,255, filed March 18, 1949.

I claim as my invention:

1. In a method of preparing a cellulosic board which comprises providing a mixture comprising mechanically disintegrated wood and a resin-forming binder in an amount ranging from about 4 to about 14% by weight of said mixture, said mixture having a moisture content ranging from about 5% to about 25%, subjecting a layer of said mixture at an elevated temperature ranging from about 280° to about 400° F. to a pressure of from about 150 to about 500 pounds per square inch for at least 3½ but less than 10 minutes, said pressure being correlated within said range with the moisture content of said mixture as tabulated:

| Moisture Content in Percent | Pressure in Pounds Per Square Inch | |
|---|---|---|
| | Minimum | Maximum |
| 20-25 | 150 | 200 |
| 15-20 | 200 | 300 |
| 10-15 | 300 | 400 |
| 5-10 | 400 | 500 | said elevated temperature being maintained below 360° F. whenever said pressure amounts to at least 400 pounds per square inch, the margins of said layer being compressed to a greater extent than the thereto immediately adjacent portions of said layer to seal said layer against moisture loss during the pressing operation, and thereafter slowly releasing said pressure to prevent blistering of said board, the improvement comprising effecting said pressing between two surfaces both having central opposed portions offset in the same lateral direction, the margins of said offset surface portions being spaced more closely from each other than the remainder of said offset surface portions whereby said board is formed with a laterally offset portion bounded by a projecting corner relatively more resistant against mechanically disintegrating forces than the thereto immediately adjacent board areas.

2. A method according to claim 1 in which said pressing of said layer is continued to reduce the thickness of the margins of the resultant board to from 40% to 60% of the thickness of the thereto immediately adjacent board area.

3. A method according to claim 1 in which said moisture content ranges from 10% to 15% and said pressure ranges from 300 to 400 pounds per square inch.

No references cited.